Jan. 22, 1952   K. A. HARMON ET AL   2,583,485
CONTROL MECHANISM FOR BRAKE HOLDERS
Filed Feb. 2, 1951   2 SHEETS—SHEET 1

INVENTORS
KENNETH A. HARMON
AND GLEN A. GUERNSEY
BY
ATTORNEYS

Jan. 22, 1952  K. A. HARMON ET AL  2,583,485
CONTROL MECHANISM FOR BRAKE HOLDERS
Filed Feb. 2, 1951  2 SHEETS—SHEET 2
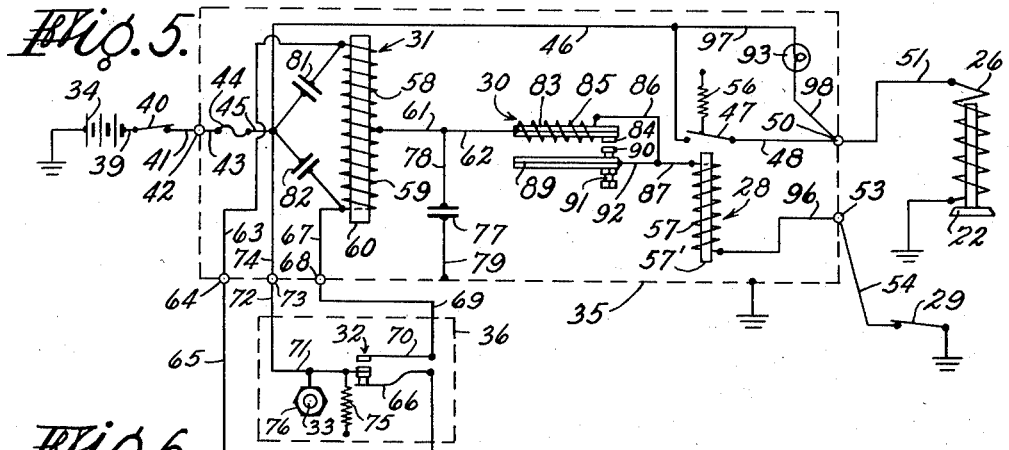
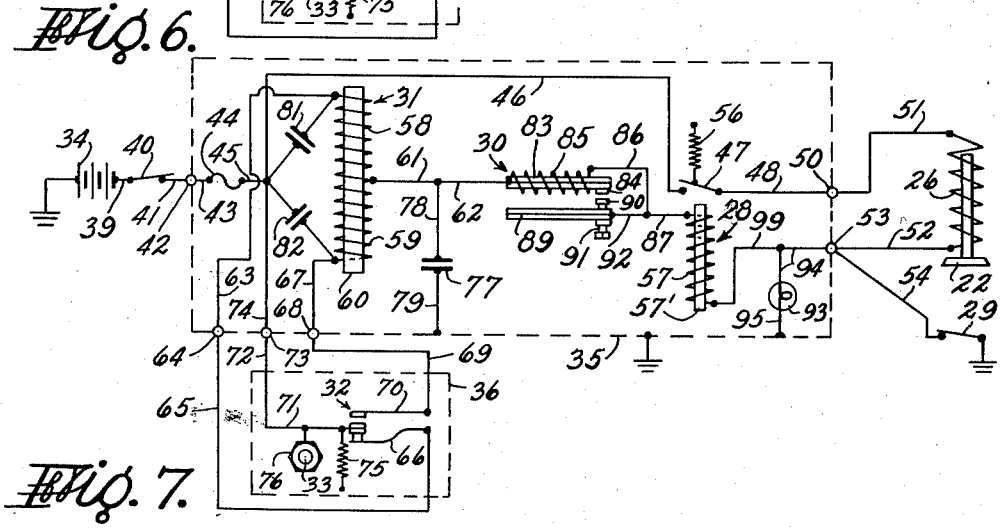
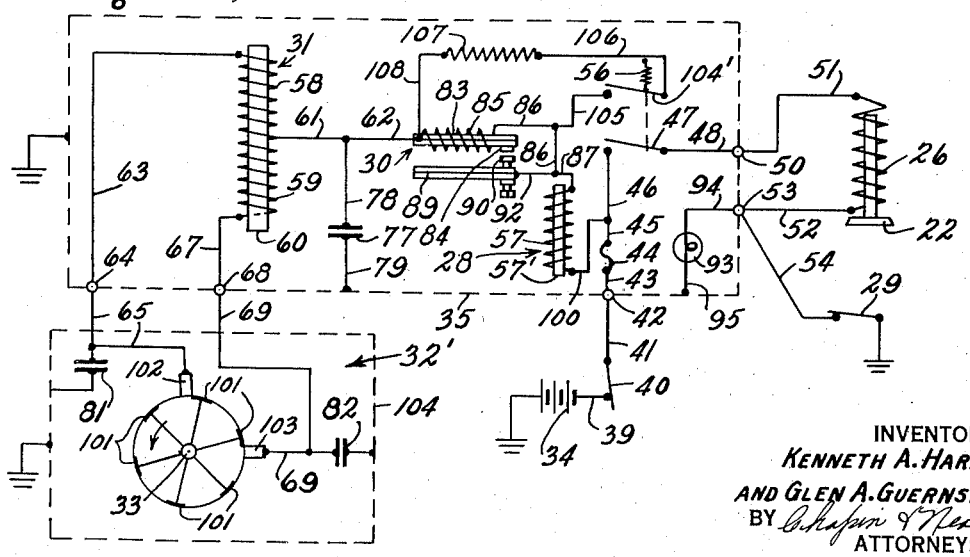
INVENTORS
KENNETH A. HARMON
AND GLEN A. GUERNSEY
BY
ATTORNEYS Patented Jan. 22, 1952

2,583,485

UNITED STATES PATENT OFFICE 2,583,485

CONTROL MECHANISM FOR BRAKE HOLDERS

Kenneth A. Harmon, Longmeadow, and Glen A. Guernsey, West Springfield, Mass., assignors to Wico Electric Company, West Springfield, Mass., a corporation of Massachusetts Application February 2, 1951, Serial No. 209,122

11 Claims. (Cl. 192—3)

This invention relates to improvements in control mechanism for the brake holders of automotive vehicles.

Brake holders are particularly useful in automotive vehicles of the type, in which the power of the motor is transmitted through a fluid coupling to the propeller shaft and driving wheels of the vehicle, for the purpose of automatically holding the vehicle stationary, after it has been brought to a stop, without requiring the operator to maintain pressure on the brake pedal. In a hydraulic braking system, the brake holder commonly consists of a valve, which is interposed in the conduit between the master cylinder and the brake cylinders of certain wheels of the vehicle and which, when closed, prevents the return of brake fluid from such cylinders and thus holds applied the brakes of the selected wheels. When this valve closes, fluid under pressure is trapped in the conduit between the valve and the selected brake cylinders, the amount of the pressure varying according to the manner in which the operator applies the brake pedal. Various means have heretofore been proposed for causing the brake-holding valve to automatically close after the brakes have been applied and the speed of the vehicle been reduced to a predetermined low value. However, the application of the brake holder invariably at a predetermined low speed does not produce uniformly good results. Much depends on the way the operator brings the vehicle to a stop. A heavy pressure on the brake pedal, that is maintained until the selected predetermined low speed is reached, will result in a lurching stop because the brake-holding valve, closing at this low speed, will trap fluid under high pressure in the brake cylinders and the vehicle will be brought to a sudden stop. Since the brake-holding valve closes at the predetermined low speed and remains closed until the vehicle is subsequently accelerated, the control is taken away from the operator and he will not be able to reduce the braking pressure by relaxing his foot pressure on the brake pedal, as he might wish to do in order to secure a smooth stop. On the other hand, if the operator applies the brakes more gradually, using less pressure applied over a greater time, the brake-holding valve may be closed at the predetermined low speed and result in a smooth stop because much less pressure will be trapped in the brake cylinders when the valve closes.

This invention has for an object the provision of an improved brake holder control which overcomes the disadvantages aforesaid and which is characterized in that the brake holder is automatically applied after a certain time delay, starting from the time when the speed of the propeller shaft decreases to a certain low value. While the extent of this time delay is variable, it may for example be approximately the time needed to decelerate the propeller shaft at a normal rate from the certain low speed to zero. Then, if the vehicle is decelerated at a higher rate, the brake holder will not be applied until after the vehicle has stopped, and if the vehicle is decelerated at a rate that is slower than normal, the brake holder will be applied before the propeller shaft has entirely stopped.

The invention has for other objects the provision in a control system for a brake holder of a time-delay means, which is universally applicable to all makes of automotive vehicles, which is easily compensated for temperature variations so as to act as well, when the vehicle is started on a cold morning as after the motor of the vehicle has warmed up, and which is readily adjustable to suit the driving habits of the operator, particularly as to deceleration of the vehicle.

These and other objects will best be understood from the detailed description of one illustrative example of the invention in the accompanying drawings in which:

Figs. 5, 6 and 7 are electrical diagrams showing various modifications of the invention.

Figure 1:
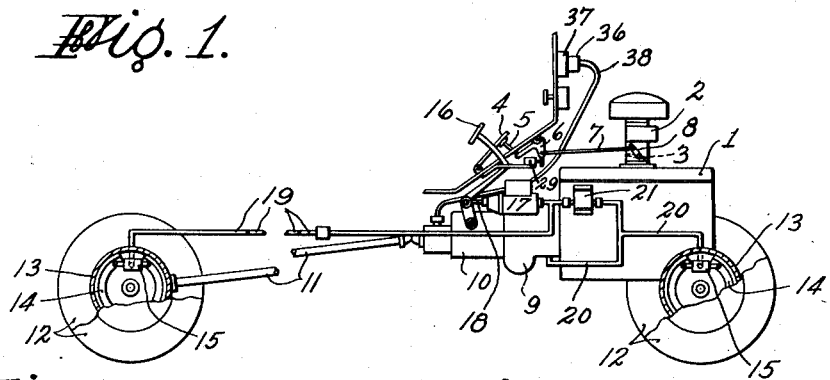
Fig. 1 is an elevational view of a wheeled, motor-driven vehicle embodying the invention, such parts of the vehicle as are unnecessary to an understanding of the invention being omitted.

In Fig. 1 there has been shown in diagrammatical form those parts of a motor-driven wheeled vehicle that need to be considered for an understanding of the present invention. There are shown the motor 1; carburetor 2; throttle valve 3; an accelerator pedal 4, operable when depressed to open valve 3 through suitable connections, such as rod 5, lever 6, rod 7 and lever 8; a hydraulic clutch 9; transmission 10; propeller shaft 11; wheels 12, the rear ones of which are driven from shaft 11 in the usual way; brake drums 13 on wheels 12; brake shoes 14 in each drum; brake cylinders 15 one within each drum for actuating the brake shoes by hydraulic pressure; a brake pedal 16; and a master cylinder 17, having therein the usual piston (not shown), which is connected, as by rod 18, to pedal 16 to be actuated by the latter, when depressed, and transmit pressure through conduits 19 to the brake cylinders on the rear wheels and through conduits 20 to the brake cylinders on the front wheels.

Figure 2:
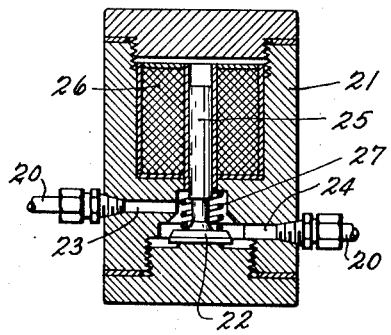
Fig. 2 is a sectional elevational view of an electromagnetically-controlled, brake-holding valve, suitable for use with the invention.

The brake holder is indicated generally at 21 in Fig. 1. It includes a normally open valve of any suitable kind adapted to be interposed in the conduit between the master cylinder 17 and those brake cylinders 14, which it is desired to control. In this case, the brake holder is interposed in the conduit 20 leading into the brake cylinders of the front wheels, which is deemed preferable although, as is well known in the art, the brake holder may also be made to control only the brakes of the rear wheels or the brakes of all the wheels. An illustrative example of one valve unit, suitable for the purpose, is shown in Fig. 2. The casing 21 has slidably mounted therein a valve 22 for controlling the communication between inlet and outlet passages 23 and 24, respectively connected on the master cylinder side and brake cylinder side in the conduit 20. The stem of valve 22 is in part a magnetic plunger 25 cooperating with a solenoid 26. A spring 27 tends to hold the valve open. This solenoid, when energized sufficiently, will close valve 22 against the pressure of spring 27. Brake holders of this general type, for the purpose described, are old and well known in the art.

The present invention has to do with the control of the brake holder and particularly with the automatic application of it, by improved time-delay means, the action of which is initiated by means responsive to the speed of the propeller shaft of the vehicle and which causes the brake holder to function to hold the brakes at or about the time that the vehicle is brought to a stop or shortly after the vehicle is stopped, the time of application of the brake holder being manually variable to suit the driver of the vehicle and the time delay provided by the time-delay means being automatically variable depending on the rate at which the propeller shaft is decelerated.

Figure 3:
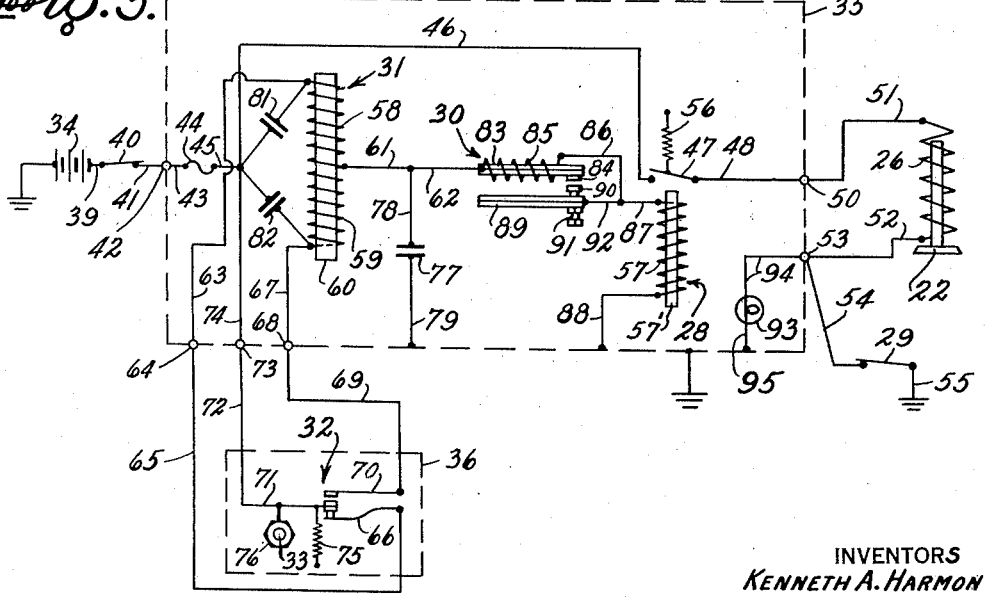
Fig. 3 is an electrical diagram of the control system for the brake-holding means.

The control system is shown in one form in Fig. 3. It includes a relay 28 for closing the energizing circuit of the brake-holder solenoid 26; a release switch 29, actuated by the accelerator, when the accelerator is released and in engine-idling position, and opened in all other positions; a time-delay means 30, and a voltage control or current limiting means, which includes a choke coil arrangement 31 together with a switching means 32 adapted to be driven from propeller shaft 11, as for example from the speedometer shaft 33. Energy is derived from the storage battery 34 of the motor vehicle. The relay 28, time-delay means 30, and voltage control means, except for the switching means 32, may conveniently be mounted in a metal case, indicated by dotted lines at 35, and adapted to be fastened to the vehicle at any suitable location and in metallic connection with the vehicle frame, whereby it is grounded. The switch means 32 may be mounted in a case 36, indicated by dotted lines in Fig. 3 and shown in Fig. 1 as located in back of the speedometer 37 of the vehicle. The shaft 33 is contained in the usual flexible sheath, indicated at 38, and driven from propeller shaft 11 in the usual manner (not shown). The release switch 29 is mounted adjacent the accelerator.

The energizing circuit for the brake-holder solenoid 26 may be traced as follows; from the ungrounded terminal of battery 34, wire 39, a normally closed hand switch 40, which may be the usual ignition switch, wire 41, terminal 42, wire 43, fuse 44, wires 45 and 46, switch 47, wire 48, terminal 50, wire 51, solenoid 26, wire 52, terminal 53, wire 54, switch 29', and wire 55 to the ground and thus to the other terminal of battery 34. Switch 47 is normally held open by a spring 56. It is adapted to be closed, when sufficient current flows through the coil 57 of relay 28 to magnetize the core 57' sufficiently for the purpose.

The voltage-control means includes a choke coil having two equal sections 58 and 59, mounted on a magnetizable core 60. The junction of these sections forms one terminal end of the voltage-control means and is connected by wires 61 and 62 to the time-delay means 30. The other terminal of coil section 58 is connected by a wire 63, terminal 64, and wire 65 to the fixed end of a contact finger 66. The other terminal of coil section 59 is connected by wire 67, terminal 68 and wire 69 to the fixed end of a spring contact finger 70. The free ends of these fingers are alternately engaged by one end of a pivoted switch arm 71, the other end of which forms the other terminal end of the voltage control means and is connected by a wire 72, terminal 73 and wire 74 to wire 45 and thus to the ungrounded side of battery 34. The switch arm 71 is drawn by a spring 75 into engagement with a cam 76, which is fixed to the speedometer shaft 33. As shown, this cam has six lobes and thus the switch arm 71 will be oscillated six times during each revolution of shaft 33. The shaft of a standard speedometer turns 1000 revolutions per mile. Hence, at a vehicle speed of say three miles per hour, shaft 33 will turn at 50 revolutions per minute and the switch arm 71 will be oscillated 300 times per minute at the described low vehicle speed. This switch arm is arranged to move into engagement with, and then, by continued movement, flex each spring contact finger. It is also arranged to engage one spring contact finger before it disengages from the other. Thus, the finger 66, which as illustrated has been previously flexed downwardly, will move upwardly, as switch arm 71 swings upwardly until the latter engages spring contact finger 70. Continued upward movement of arm 71 flexes finger 70 upwardly and causes it to disengage from spring contact finger 66. The arrangement is such that one finger or the other is always connected to switch arm 71. Thus, one section 58 or the other section 59 of the choke coil is always connected to the ungrounded terminal of the battery 34 (whenever the ignition switch 40 is closed) and a circuit is completed because there always exists, as will later appear, a connection from the grounded terminal of the battery through coil 57 and the time delay means 30 to wire 62.

When the circuit is closed to one section of the choke coil, a current flow is established but, due to the inductance of the coil, there is a lag in building up current and time is required for the current to reach its maximum value. As the speed of the cam increases, the time interval, during which a circuit to either section of the choke coil is closed, decreases and the maximum values to which the current can build up decrease. A current flow is built up through one section of the choke coil in one direction and then through the other section of the coil in the opposite direction and a pulsating direct current wave is produced. This wave is smoothed out to some extent by the use of a condenser 77, one side of which is connected by a wire 78 to wires 61 and 62 and the other side of which is connected by a wire 79 to the case 35 and thus grounded.

Figure 4:
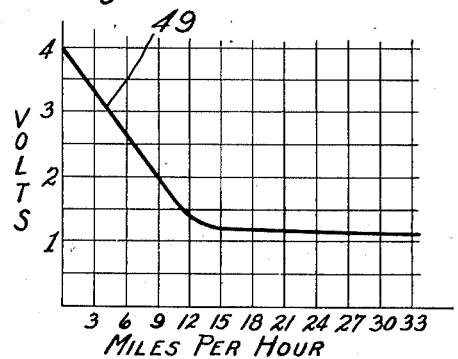
Fig. 4 is a graph illustrative of the operation of the voltage control means.

The choke coil and breaker arrangement constitute a means for varying the voltage applied to the time delay means 30 and relay coil 57. One illustrative example of the result obtained is shown in the graph 49 of Fig. 4, which shows voltage at the output wire 61, 62 plotted against propeller shaft speed in terms of vehicle speed in miles per hour (assuming no slippage of the driving wheels). Maximum voltage is obtained when the propeller shaft is stopped and both choke coil sections 58 and 59 are connected to the battery at the same time and in parallel. This maximum may be, for example, 4 volts. When only one choke coil section is connected, the maximum value will be somewhat less, say for example, 3.5 volts. As the propeller shaft 11 speeds up, an initially very rapid decrease in voltage is secured, the voltage dropping to say 1.5 volts when a car speed of 11 miles per hour is attained and, thereafter the decrease is at a much slower rate. The voltages below one and one-half volts are in this case insignificant because they are not effective to cause actuation of the time-delay means.

In connection with the breaker arrangement, it is desirable in order to avoid arcing between the contacts on the spring arms 66 and 70 and those on switch arm 71 to bridge across each cooperating pair of such contacts a condenser, such as shown at 81 and 82.

The time-delay means 30 comprises a bimetallic thermostatic member 83, suitably fixed at one end and carrying near its other and free end a contact 84. A resistance coil 85 is arranged to heat this member 83. The fixed end of the member 83 and one end of coil 85 are connected together and to the wire 62. The other terminal of coil 85 is connected by wires 86 and 87 to one terminal of the coil 57 of relay 28 and the other terminal of coil 57 is connected by a wire 88 to case 35 and thereby grounded. The time-delay thermostat 83 is compensated for variations in ambient temperature by using another thermostat member 89 of identical characteristics. This member 89 has one fixed end, located adjacent the fixed end of member 83, and its other end carries a contact 90, preferably adjustable in any suitable manner, as indicated conventionally by the screw 91, which is threaded through the free end of member 89. The contacts 84 and 90 are adjusted for a predetermined spacing between them, when no current flows through the heating coil 85. The thermostat 89 is connected by a wire 92 to wire 87 and thus to the relay coil 57. Variations in ambient temperature will cause the thermostats 83 and 89 to bend equally in the same direction and maintain its predetermined spacing of the contacts. When the coil 85 is energized, it heats thermostat 83, causing it to bend toward the thermostat 89 and carry the contact 84 toward the contact 90. When the thermostat 83 is sufficiently heated the contacts 84 and 90 will be engaged. This occurs after the lapse of a certain time interval. Prior to the engagement of these contacts, it is not possible for sufficient current to flow in the energizing circuit of relay coil 57 to cause switch 47 to close against the force biasing it to open position, even when the applied voltage is at its maximum value because of the resistance of heating coil 85. However, when the contacts 84 and 90 engage, the coil 85 is shunted out by a connection between the wires 62 and 87 which comprises thermostat 83, engaged contacts 84 and 90, screw 91, the free end of thermostat 89 and wire 92. This shunting out of coil 85 cuts down the resistance of the energizing circuit relay coil 57 and enables sufficient current to flow therein, when the applied voltage is within certain limits say, for example, those obtained at vehicle speeds of from zero to three miles per hour, to close switch 47 and thus the energizing circuit to the brake-holder solenoid 26. Once the relay 28 has pulled in and closed switch 47, the latter may be held closed by a smaller force, such as that available after the contacts 84 and 90 have been separated and the heating coil 85 has been interposed in the energizing circuit to relay coil 57, provided, of course, that the applied voltage is within the limits which are available at very low vehicle speeds, or zero vehicle speed. The relay may, for example, drop out when the propeller shaft reaches a speed corresponding to a vehicle speed of about 5 miles per hour.

In the particular illustrative example shown herein, each of the choke coils 58 and 59 consists of 700 turns of No. 26 "Formvar" wire and has a resistance of 7 ohms. These coils are simultaneously wound and mounted on a core made up of standard E and I laminations of silicon steel. The heating coil 85 consists of No. 36 "Tophet C" resistance wire and has a resistance of 10 ohms; coil 57 a resistance of 12 ohms; coil 26 a resistance of 3 ohms; condenser 77 a capacity of 1000 mfd. and condensers 81 and 82 a capacity of .1 mfd. each. These values are not critical and may be varied considerably. The set of values given merely illustrates one set that has been found suitable for the purpose and, since there may be many others that are suitable, it is not desired to limit the invention to the one set, herein disclosed.

It has been found desirable in order to effect a smooth release of the brakes to shunt across the accelerator switch 29 a ballast resistor having a resistance, which is low when the resistor is cold and which rises rapidly when the resistor becomes hot. One resistor, suitable for the purpose, is a 3 c. p., 6-8 volt automative type lamp 93. One terminal of this lamp is connected by a wire 94 to terminal 53 and the other terminal of the lamp is connected by a wire 95 to case 35 and thereby grounded. When switch 29 is closed, lamp 93 is shunted out and full current flows through the coil 26. When switch 29 opens, the lamp is placed in series with coil 26 and by its resistance decreases the current flowing through coil 26. The resistance of the lamp, when cold, is relatively low but it increases rapidly, as the filament becomes heated, soon reaching a value such that the current through coil 26 is decreased sufficiently to allow valve 22 to open. The arrangement effects a gradual reduction in current flow in coil 26 and thus a reduction of the force opposing spring 27 so that the valve 22 opens gradually, thus avoiding the sudden opening of the valve and resulting sudden release of the brakes, that would otherwise occur.

In the operation of decelerating the vehicle, the operator will release the accelerator 4, allowing the latter to move to engine-idling position and the accelerator switch 29 to close. Pressure on pedal 16 will cause the brakes to be applied and the vehicle to be decelerated at a rate varying with the degree of hydraulic pressure employed. While the energizing circuit of the heating coil 85 is closed at all times until after relay 28 pulls in, the voltage available, at relatively high propeller shaft speeds, say those corresponding to vehicle speeds above 11 miles per hour, are of insignificant value and are not effective, regardless of the length of time of application, to cause enough current to flow through this coil to materially heat the thermostat 83. Effective values of applied voltage, commence when the propeller shaft speed decreases to a certain value, say for example, that corresponding to a vehicle speed of 11 miles per hour. As the propeller shaft speed decreases below the last-named speed, the voltage applied to coil 85 rises rapidly as shown by graph of Fig. 4, resulting in rapidly rising current which soon heats the bi-metallic thermostat 83 and causes contact 84 to move toward and eventually into engagement with contact 90. Engagement of these contacts reduces the resistance of the energizing circuit of the coil 57 of relay 28, causing the switch 47 to close, thus closing the energizing circuit to the brake holder solenoid 26. The latter closes valve 22 against the force of spring 27 and traps brake fluid in the brake cylinders of the front wheels. The engagement of the contacts 84 and 90 causes the heating coil to be shunted out, as described, and lowers the resistance of this circuit to such an extent that sufficient current will flow through coil 57 at voltages at or above a predetermined value, say that obtained at a vehicle speed of three miles per hour to cause the closing of switch 47. As soon as thermostat 83 cools enough, contacts 84 and 90 will separate, again placing the resistance of coil 85 into the energizing circuit of coil 57. This will lower the current in coil 57 but not to such an extent as to allow the relay to drop out and open switch 47, unless the voltage drops below that available at a vehicle sped of say five miles per hour. The contacts 84 and 90 will again close and subsequently again open, and so on, the contacts alternately opening and closing as long as the propeller shaft 11 remains stopped or is moving below the predetermined speed at which the relay 28 will drop out and release switch 47, say for example, at a speed corresponding to a vehicle speed of 5 miles per hour.

The extent of the time delay is manually variable by adjustment of the spacing of the contacts 84 and 90. This enables adjustment of the control to suit the driving habits of different operators. Then, also, the extent of time delay will vary to some extent with the rate of deceleration because of variation in voltage. For example, if the driver should apply the brakes suddenly and lock the wheels, the maximum effective voltage of 3½ or 4 volts would be immediately available and less time would be required to heat thermostat 83 to the necessary degree than if the driver should decelerate at a normal rate, when the voltage would vary from the minimum to the maximum effective values and the average voltage would be less, whereby slightly more time would be required to heat the thermostat 83 for the purpose. Also, if the thermostat is cold, as at starting or for other reasons to appear, the contacts are more widely separated and more time is required to move them together, say from 2 to 3 seconds. Under normal operating conditions the time delay may be from 1½ to 2 seconds.

The time of application of the brake holder depends on the rate of deceleration of the propeller shaft. The brake holder will be applied in a certain time after the propeller shaft has, decreased to a relatively low speed, say, for example, one corresponding to a vehicle speed of 11 miles per hour. If the reduction in speed of the propeller shaft from the last-named speed to zero occurs at a normal rate, the brake holder will be applied at zero speed. A higher rate of deceleration of the propeller shaft will bring its speed to zero in less time than that afforded by the time delay means and the brake holder will not be applied until after the vehicle stops. This allows the operator to maintain control of the braking pressure to the very end of the deceleration period, enabling him to decrease the braking pressure and avoid the lurching stop that results, when the brake holder closes before the vehicle stops and braking fluid under relatively high pressure is trapped in the brake cylinders. If the deceleration is effected at a rate slower than normal, the brake holder will be applied before the propeller shaft stops but since relatively low braking pressure is used, the trapping of fluid in the brake cylinders by the closing of the brake holder valve will not adversely affect the smoothness of the stop. If the driver should coast to a stop, the brake holder may be applied at a propeller shaft speed corresponding to a vehicle speed of from 2 to 3 miles per hour but there will be no braking pressure available until the driver presses on the brake pedal 16. In general, a quick stop results in a quick application of the brake holder and a slow stop results in a slow application of the brake holder. A driver, who is in the habit of decelerating his car at high rates, will wish the control adjusted for a shorter time delay than the driver who customarily decelerates his car at a slower rate.

The use of the brake holder on the front wheels only affords desirable anti-skid protection. If the driver applied his brakes to lock the wheels, while they are on ice, the brake holder will be applied in a few seconds but it will not hold braking pressure in the rear wheels, so that the driver can release his brake in order to pull the car out of a skid, allowing the rear wheels to turn and, as soon as they reach the release speed the brake-holder valve will open. However, the delay afforded by the time delay means, after the brakes lock the wheels, is normally sufficient for the operator to take the necessary action without the necessity of the rear wheels having to return to the release speed.

It is not essential that the release switch 29 be included directly in the energizing circuit of the brake holder coil 26 in order to cause opening of such circuit when the vehicle is accelerated. As shown in Fig. 5, the accelerator switch can be interposed in the energizing circuit of relay coil 57 and effect the desired result. Opening of the accelerator switch opens the circuit to relay coil 57, causing switch 47 to open and break the energizing circuit of coil 26. In this case, the former wire 52 is eliminated and that terminal of coil 26, formerly connected to this wire, is grounded. The ground side of coil 57 is connected by a wire 96 to terminal 53. The lamp 93 is moved to a new location, being bridged across the terminals of switch 47 by wires 97 and 98, the former wires 94 and 95 being eliminated. This arrangement has the advantage of securing a quick, positive opening of the relay switch 47 and of avoiding current flow through the heating coil 85, except during deceleration of the vehicle.

In Fig. 6, the accelerator switch 29 is arranged to break the circuit to relay coil 57 and the circuit to the brake-holder coil 26. This is effected by replacing the wire 88 of Fig. 3 by a wire 99, which connects the same end of relay coil 57 to the wire 94 and thus to terminal 53. However, when the accelerator switch 29 opens, the lamp 93 is placed in circuit with both coils 26 and 57 and the dropping out of the relay is not quite as fast as it is with the Fig. 5 arrangement.

In Fig. 7, there has been shown a modification in the form of the switching means of the voltage control means; an arrangement to prevent cycling of the bi-metal member 83 of the time-delay means; and a reverse connection of the battery terminals to the energizing circuit of the relay coil 57. The battery terminal 42 has been relocated adjacent relay 28 and is connected by a wire 43, fuse 44, wire 45 and a wire 100 to the lower end of coil 57. The movable member of the switching device 32' is grounded. It is thus only necessary to use two wires, rather than the former three to connect the switching device 32' to the choke coil arrangement 31, the former wires 14 and 72 and terminal 73 being omitted. The switching device consists of a commutator having a plurality (six as shown) of metallic segments 101, each connected to the speedometer shaft 33, by which the commutator is revolved, and two brushes 102 and 103, respectively connected as before to the choke coils 58 and 59. The condensers 81 and 82 are located in the same case 104 that houses the commutator and that is located in back of the speedometer 37 in the place formerly occupied by casing 36. The commutator has six segments of equal angular extent separated by spaces, which are also of equal angular extent and twice the angular extent of a segment. The brushes are each slightly greater than half the angular extent of any segment and are spaced so that as one brush is just about to leave one segment the other brush is just making contact with another segment. The switching device functions in the same general way as before, directing current alternately through the choke coils 58 and 59 and maintaining always a circuit through one or the other of these coils. The energizing circuit for the brake-holder coil 26 is the same as shown and described in connection with Fig. 3. The energizing circuit for relay coil 57 is essentially the same, except for the reversal of direction of current flow and the use of a commutator in place of the circuit breaker shown in Fig. 3, and except for a shunting means for the heating coil 85 to prevent the cycling of thermostat 83, that was possible with the Fig. 3 arrangement, as the thermostat heated and cooled. A second switch 104' is provided to control this shunt and this switch is closed and opened simultaneously with the closing and opening of switch 47 by the coil 57, when sufficiently energized and deenergized respectively. One terminal of switch 104' is connected by a wire 105 to wire 86 and thus to one terminal of heating coil 85. The other terminal of switch 104' is connected by a wire 106 to one terminal of a resistor 107, the other terminal of which is connected by a wire 108 to the other terminal of the heating coil 85. When the coil 85 has heated thermostat 83 sufficiently to engage contacts 84 and 90, the resistance of coil 85 is removed from the energizing circuit of coil 57 and the switches 47 and 104' will close, respectively closing the energizing circuit to coil 26 and a shunt circuit around coil 85. The thermostat 83 will cool and contacts 84 and 90 will then separate but the shunt circuit closed by switch 104' will prevent the coil 85 from again heating the thermostat enough to cause closing of contacts 84 and 90. The resistor 107 limits the current flow through coil 85 so that it cannot heat thermostat 83 enough to cause closing of the contacts. At the same time, some heat is produced to maintain the thermostat above ambient temperature. By reducing the resistance of the resistor 107, more current is diverted from coil 85 and the temperature of the thermostat will fall to a lower value, thus increasing the amount of the time delay, the maximum being secured when the resistance is reduced to zero and all current is shunted from coil 85.

The invention thus affords a brake-holder control that is based on a time-delay means, the effective action of which is initiated, when the propeller shaft of the vehicle reaches a certain low speed, and the extent of which may be approximately the time needed to decelerate such shaft at a normal rate from the above-mentioned low speed to zero. The control may, for example, be adjusted so that the brake holder will be applied at zero propeller shaft speed, when deceleration is at a normal rate of say from 8 to 10 feet per second per second. Then, if a high rate of deceleration, say for example 18 feet per second per second, is used over the entire period of deceleration, the brake holder will not be applied until after the propeller shaft has stopped. However, if the high rate is used initially, and later the braking pressure is relaxed, the brake holder can be applied at zero speed.

The invention affords a time-delay type of brake holder control that is applicable to any type of automobile. The control is relatively simple and is adapted for quantity production at low unit cost. Dependable compensation for temperature variations is simply and inexpensively provided and the control is readily adjustable to suit the wishes of different drivers.

What is claimed is:

1. Brake control means for wheeled vehicles, comprising, a brake holder, electrical means for actuating the brake holder, a first circuit for energizing said means, electromagnetically operable means including a magnet coil operable when sufficiently energized to close the first circuit, a second circuit for energizing the magnet coil and adapted for connection to a source of electricity, a heating coil and a voltage-varying means included in series with said magnet coil in the second circuit, said voltage-varying means adapted to be driven from the propeller shaft of the vehicle and varying the voltage applied from said source to said coils inversely with propeller-shaft speed from a maximum effective value at zero speed to a minimum effective value at a speed corresponding to a low vehicle speed of a few miles per hour and to lesser and ineffective values at speeds above the last-named speed, the combined resistance of said coils being such that the current flow in the second circuit even when the applied voltage is at its maximum effective value is not great enough to energize the magnet coil sufficiently to close the first circuit, a normally open thermal switch actuated to closed position by the heat from the heating coil, a circuit for shunting the heating coil out of the second circuit and closed and opened by said thermal switch, the shunting of the heating coil out of the second circuit reducing the resistance thereof sufficiently so that enough current will flow through the magnet coil to close the first circuit when applied voltage is at or above a predetermined value between said maximum and minimum values, the subsequent opening of the thermal switch by cooling of the heating coil increasing the resistance of the second circuit but not enough to cause opening of the first circuit unless the applied voltage falls to another effective value below said predetermined value, and a release switch adapted to be actuated when the vehicle is accelerated for opening the first circuit.

2. The combination as claimed in claim 1, in which the thermal switch includes an actuating element comprising a bimetallic thermostat heated by the heating coil and closing the thermal switch when heated to a sufficient extent.

3. The combination as claimed in claim 2 in which a compensating bi-metallic thermostat subject only to ambient temperature is mounted adjacent the first thermostat and is movable to the same degree and in the same direction as the first thermostat for any given change in ambient temperature, and in which the thermal switch includes cooperating contacts movable one by the first and the other by the second thermostat.

4. The combination claimed in claim 1 in which the voltage-control means has two terminal ends, two choke coils connected together at one end and to one of said terminal ends, and switch means adapted to be actuated by said shaft and connected to the other of said terminal ends, said switch means operable to connect alternately with the other ends of said choke coils for directing current from said source alternately through said choke coils in opposite directions, the circuit through each choke coil being completed slightly before the circuit to the other choke coil is broken.

5. The combination as claimed in claim 1 in which there is a second shunt circuit for the heating coil, and a control switch for the second shunt circuit closed and opened by the electromagnetically-operable means.

6. The combination as claimed in claim 5 in which a current limiting resistor is included in the second shunt circuit.

7. The combination as claimed in claim 1 in which the release switch is included in the first circuit.

8. The combination as claimed in claim 1 in which the release switch is included in the second circuit.

9. The combination as claimed in claim 1 in which the release switch is included in both circuits.

10. Brake control means for wheeled vehicles, comprising, a brake holder, electrical means for actuating the brake holder, a first circuit for energizing said means, electromagnetically operable means including a magnet coil operable when sufficiently energized to close the first circuit, a second circuit for energizing the magnet coil and adapted for connection to a source of electricity, a heating coil included in series with said magnet coil in the second circuit, means adapted to be driven from the propeller shaft of the vehicle for varying the voltage applied from said source to said coils inversely with propeller shaft speed from a maximum effective value at zero speed to minimum effective value at a speed corresponding to a low vehicle speed of a few miles per hour and to lesser and ineffective values at speeds higher than the last-named speed, the combined resistance of said coils being such that the current flow in the second circuit even when the applied voltage is at its maximum effective value is not great enough to energize the magnet coil sufficiently to close the first circuit, a normally open thermal switch actuated to closed position by the heat from the heating coil, a circuit for shunting the heating coil out of the second circuit closed and opened by said thermal switch, and a release switch adapted to be actuated when the vehicle is accelerated for opening the first circuit.

11. In an automotive vehicle, having an engine, propeller shaft, front wheels, rear wheels driven by the propeller shaft; a fluid pressure braking system including an actuating pedal, brake cylinders on the front wheels, a supply conduit therefor, brake cylinders on the rear wheels and a supply conduit for the brake cylinders on the rear wheels; a valve in the first supply conduit operable when closed to hold the brakes on the front wheels after they have been applied by actuation of said pedal, an accelerator for controlling the engine, a release switch respectively closed and opened when the accelerator is in or out of engine-idling position, electrical means operable when sufficiently energized to close said valve, an energizing circuit for said means, a normally open starting switch, said starting and release switches included in series with said means in said circuit, a magnet coil operable when sufficiently energized to close the starting switch, a second circuit for energizing the magnet coil and adapted for connection to a source of electricity, a heating coil and a voltage control means included in series with said magnet coil in the second circuit, said voltage control means including an actuating shaft driven from the propeller shaft and causing the voltage applied from said source to said coils to vary inversely with propeller shaft speed from a maximum effective value at zero speed to a minimum effective value at a low vehicle speed of a few miles per hour and to lesser and insignificant values at greater speeds, the resistance of said coils being such that the current flow through the magnet coil when the voltage is at its maximum value is not great enough to energize the magnet coil sufficiently to close the starting switch, a normally open thermal switch actuated to closed position by the heat from the heating coil, a circuit for shunting out the heating coil and closed and opened by said thermal switch, the shunting of said coil decreasing the resistance of the second circuit and enabling enough current to flow through the magnet coil to cause closing of the starting switch when the applied voltage is at or above a predetermined value between said effective values, the subsequent opening of the thermal switch by cooling of the heating coil increasing the resistance of the second circuit and reducing the current flow through the magnet coil but not to a value low enough to cause opening of the starting switch at voltages at or above said predetermined value.

KENNETH A. HARMON.
GLEN A. GUERNSEY.

No references cited.